Sept. 12, 1939.                F. KOCH                    2,172,390
                          POWER TRANSMITTER
                       Filed Feb. 25, 1938         2 Sheets-Sheet 1
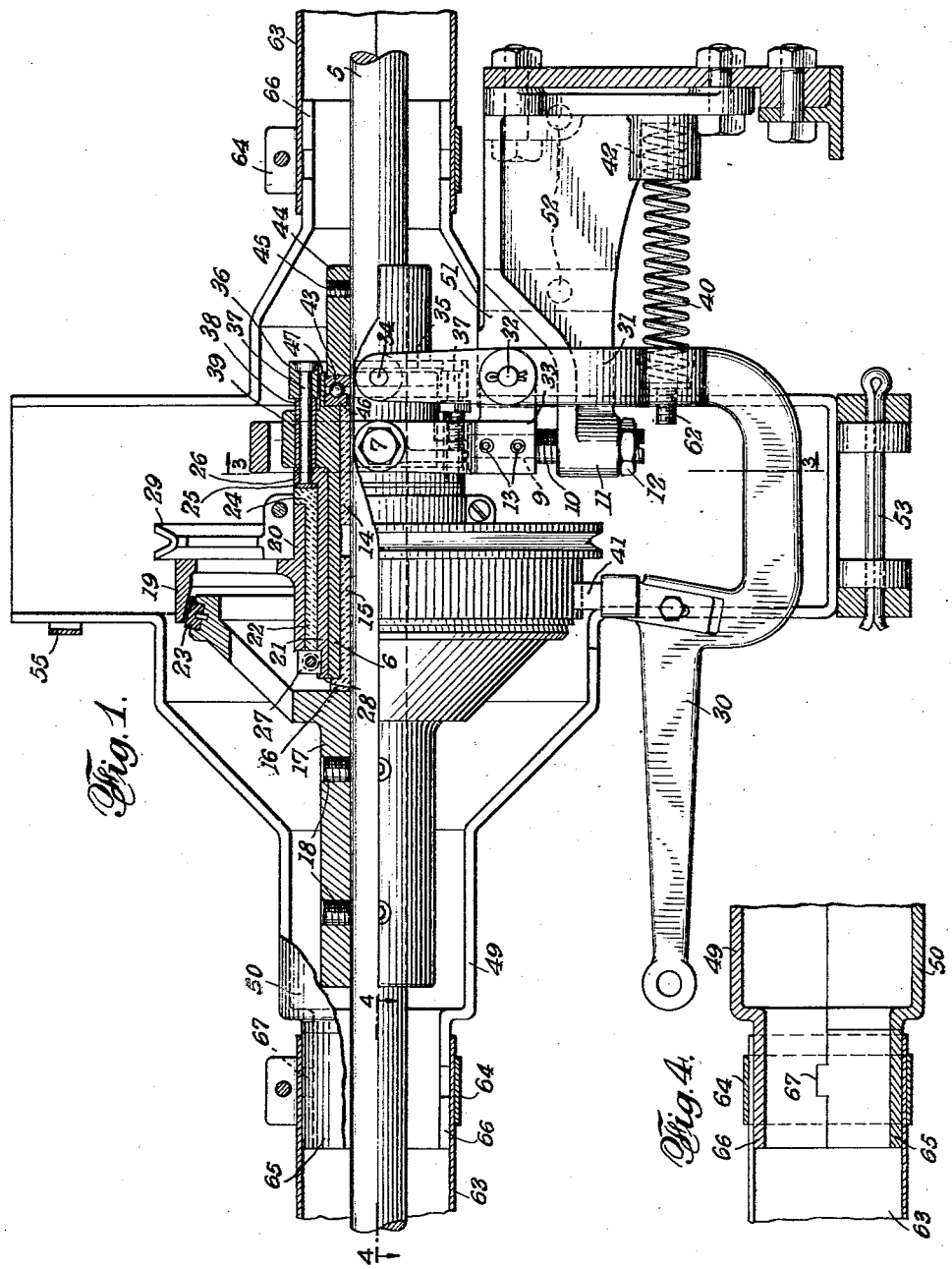
INVENTOR
FREDERICK KOCH
BY
ATTORNEY Sept. 12, 1939.     F. KOCH     2,172,390
POWER TRANSMITTER
Filed Feb. 25, 1938     2 Sheets-Sheet 2
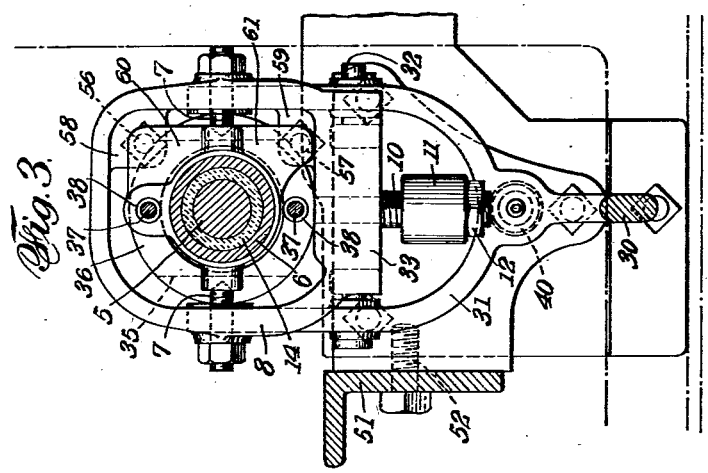
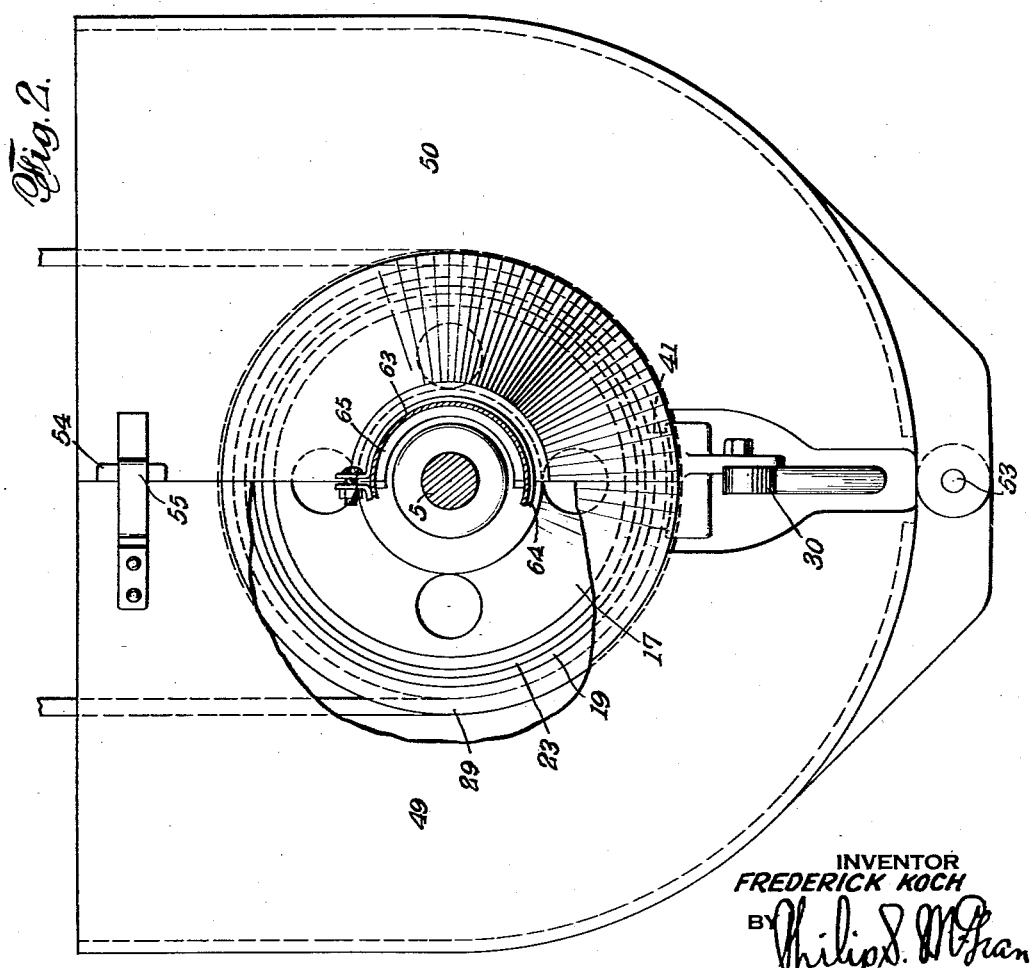
INVENTOR
FREDERICK KOCH
BY Philip S. McFran
ATTORNEY Patented Sept. 12, 1939

2,172,390

UNITED STATES PATENT OFFICE 2,172,390

POWER TRANSMITTER

Frederick Koch, Sparta, N. J., assignor to Consolidated Sewing Machine & Supply Co. Inc., New York, N. Y., a corporation of New York Application February 25, 1938, Serial No. 192,448

12 Claims. (Cl. 192—17)

The invention herein disclosed relates to power transmitters, such as employed in the power tables for sewing machines and the like. This patent application is a continuation in part of application for Patent, Ser. No. 145,233 filed May 28, 1937, and allowed August 28, 1937.

Special objects of the invention are to provide a power transmitter of efficient design and construction, which will not require oiling and which will operate over long periods of time without attention or servicing of any kind.

Other objects are to provide apparatus of this character of simple, practical and inexpensive construction, safe and reliable in operation and easily installed and adjusted.

Other desirable objects and the novel features of the invention by which the objects are attained will appear and are set forth in the following specification.

The drawings accompanying and forming part of the specification illustrate one of the practical commercial embodiments of the invention, and which illustration is primarily by way of disclosure, the structure being capable of change and modification in various ways, all within the true intent and broad scope of the invention as hereinafter defined and claimed.

Fig. 1 is a broken longitudinal sectional view of one of the transmission units.

Fig. 2 is a partly broken elevation of the left hand end of the apparatus shown in Fig. 1.

Fig. 3 is a broken cross-sectional view as on substantially the plane of line 3—3 of Fig. 1.

Fig. 4 is a broken sectional detail as on line 4—4 of Fig. 1.

In the several views, a power shaft is indicated at 5, journalled in a bearing sleeve 6, supported on the centering bolts 7, in the arms of a yoke 8, swivelled at 9, on the plain upper end of a levelling screw 10, vertically adjustable in bracket 11. A lock nut 12, secures this screw in the position of adjustment and a set screw 13, is provided to fix the swivelling yoke on the upper end of the adjustment screw. Permanently lubricated or so-called "oiless" bushings 14, 15, are indicated in opposite ends of the bearing sleeve 6, providing permanent bearings for the shaft and the last mentioned of these bushings is shown as flanged over the end of the sleeve at 16, to provide a thrust bearing for the driving clutch member 17, fixed on the shaft at 18.

Cooperable with the driving clutch member is a driven clutch member 19, having an elongated hub 20, rotatable on the clutch sleeve 21, which has a sliding bearing over the bearing sleeve 6.

The hub of the movable clutch element is shown as having an anti-friction oiless bushing 22, flanged at the end, which is outside or away from the meeting clutch faces 23, as indicated at 24, for engagement by a thrust washer 25, which has a bearing against the annular flange 26, on the end of the bearing sleeve. A split retainer collar 27, is shown seated in a groove 28, in the opposite end of the sliding clutch sleeve. The driven clutch member thus has a long rotary bearing on the sliding clutch sleeve confined between end shoulders and a rotary thrust bearing is provided at the proper end for thrusting this clutch element in engagement with the driven element. The elongated bearing sleeve 20 also provides a firm mounting for the split pulley 29, which carries the drive belt for the sewing machine or other mechanism.

Shifting of the clutch and automatic braking and release of the driven clutch member is accomplished in the illustration by a combination lever 30, having forked arms 31, at one end hung on a pivot pin 32, carried by laterally extending bracket arms 33, of the yoke 8, the upper ends of these arms carrying studs 34, entering vertical slots 35, in the sides of a clutch collar 36. The latter is connected with the clutch sleeve by bolts 37, extending through spacing sleeves 38, into screw seats in the end flange 26. As shown particularly in Fig. 1, the upper connection, that is, bolt 37, surrounded by spacing sleeve 38, has a sliding bearing at 39, through the upper portion of the bearing sleeve 6, and whereby the sliding clutch sleeve is held against rotation and confined to straight sliding movement of the bearing sleeve. A spring 40, acting on the lever below the center of pivotal support provides force for holding the clutch normally disengaged and a brake element 41, in holding engagement with the movable clutch element.

Spring 40 is shown as mounted in a spring socket 42, in the supporting bracket 11.

End thrust as between the shaft and bearing sleeve is taken care of in the illustration by an antifriction ball bearing including companion race rings, one of them 43, fixed in the end of the bearing sleeve 6, and the other ring 46, loosely retained by the inturned end of the sleeve at 47, in position for engagement with a thrust sleeve 44, fixed on the shaft. Located as it is in the end of the bearing sleeve, this thrust bearing is in position to directly receive lubricant from the "oiless" bearing 14.

The mechanism is covered and protected in the illustration by a two part casing consisting of the cooperating guard sections 49, 50, the first supported by an angularly projecting mounting lug 51, bolted to the supporting bracket at 52, and the second pivoted at the bottom to the first guard section at 53, and releasably secured at the top by a latch lug 54, engageable with the spring latch 55, on the first section.

With the construction described, all parts, including the guard casing are supported by the same mounting bracket, and so are kept in the same general relation regardless of adjustments of said mounting bracket. Adjustments for necessary levelling of the shaft however are readily accomplished by turning the levelling screw 10 in the bracket. The latter adjustments do not disturb the relation of the shift lever as this is mounted on the yoke which carries bearing sleeve.

The stationary bearing sleeve provides a long lubricated bearing for the shaft and thrust of the shaft is taken at one end by the lubricated flange of the bearing bushing and at the opposite end by the lubricated anti-friction ball bearing. The clutch sleeve has a sliding movement over the bearing sleeve and is guided for straight sliding movement thereover by the bushed connecting bolt extending from the clutch collar through the guide bearing 39, in the bearing sleeve. Only a slight sliding movement is necessary to effect engagement and disengagement of the free clutch element relative to the fixed clutch element and the power for such movement is applied through the clutch collar 36, which is rigidly attached to the end of the bearing sleeve and which is spaced free of all rotating parts. The driven clutch element rotates freely on the sliding clutch sleeve with a lubricated thrust bearing at the end where the clutch engaging pressure is applied. All operating parts are enclosed and protected and the entire structure is such that it will operate over long periods without attention of any sort. When the lubricated bearings wear out, these can be easily replaced at low cost by new bearing bushings, which if necessary, may be slightly oversize to take up any wear. The driving clutch member 17 is shown as cupped to extend inwardly over the adjoining ends of the bearing sleeve and clutch sleeve toward the driven clutch member, this construction providing for the long shaft bearing, the long clutch sleeve and elongated hub of the movable clutch element, with said movable clutch element located intermediate the ends of the hub and all this construction in a comparatively short length unit. This also enables a relatively small size guard casing to enclose all the parts and to provide sufficient freedom for adjustment of the parts within the guard casing. The swivelling of the yoke 8 on the levelling screw 10, and the horizontal swivelling of the bearing sleeve in the arms of the yoke provides a practically universal mounting for the shaft, enabling exact alignment of the shafting. The horizontal pivot screws 7 may be shifted laterally if required, for effecting exact adjustments in aligning the shaft. To adjust the bearing sleeve for shaft aligning purposes and to secure it in the position of adjustment, screw bolts are indicated at 56, 57, in screw seats in the corner pads 58, 59, of the yoke 33, Figs. 1 and 3, engageable with pads 60, 61, on the adjoining end of the bearing sleeve, above and below the trunnion screws 7. By adjustment of bolts 56, 57, the bearing sleeve may be rocked one way or another for shaft aligning purposes and then be fixedly secured in the position of adjustment. This securing of the bearing sleeve against any rocking movement also takes up thrust from engagement of the brake block 41 with the brake drum.

The spring 40 preferably is made relatively long, so as to allow for the vertical adjustments of the bearing sleeve and permit free action of the brake. Adjustment of the brake pressure is provided for in the illustration by means of an abutment screw 62, for the outer end of the spring adjustable in the brake lever 30.

To completely enclose the shafting between the different power transmitters, shaft enclosing casings are indicated at 63, secured over the ends of the guard casings by split clamps 64. In practice, semi-circular guard segments 65, are provided in cooperative engagement with corresponding semi-circular portions 66, at the ends of the back guard section 49. Tongue and groove connections 67, between these companion parts hold the segments in line, while the surrounding sheet metal casings 63 and split clamps 64, secure these parts in firm engagement. This construction, as indicated in Figs. 1 and 4, provides complete cylindrical enclosures at the ends of each guard casing, with which the ends of the movable front cover 50 cooperate.

What is claimed is:

1. A power transmitter of the character disclosed, comprising in combination a power shaft, a bearing sleeve supporting said shaft and provided with a guide passage substantially parallel with the shaft, a clutch sleeve slidable over said bearing sleeve, a driving clutch member fixed on the shaft at one end of the bearing sleeve, an anti-friction bearing between the shaft and opposite end of the bearing sleeve, a clutch operating member at the last mentioned end of the bearing sleeve, an operating connection extending from said clutch operating member through said guide passage to the adjacent end of the clutch sleeve and a driven clutch member confined in rotatable relation on said clutch sleeve in position for cooperation with said driving clutch member.

2. A combination as in claim 1, with a lubricated bearing bushing for the shaft in said bearing sleeve having an annular flange at the end opposed to the driving clutch member and a lubricated bushing in the driven clutch member having a lubricated end flange forming a thrust bearing at the end where the clutch operating member is located.

3. A combination as in claim 1, in which the clutch sleeve has a flange at the end where the clutch operating member is connected and in which a lubricated thrust bearing is provided between said end flange and the adjoining end of the driven clutch member.

4. A combination as in claim 1, in which the clutch operating member is a collar freely surrounding the anti-friction thrust bearing.

5. A combination as in claim 1, in which said anti-friction bearing comprises a thrust sleeve fixed on the shaft, the adjoining end of the bearing sleeve having a recess therein, a fixed ball race in said recess and a companion cooperating ball race loosely retained in said recess adjoining said thrust sleeve.

6. A combination as in claim 1, in which the clutch operating means includes a collar connected as described with the clutch sleeve, a spring actuated shift lever having a fork connected with said collar and a brake element on said lever for engagement with the driven clutch member.

7. A combination as in claim 1, with a supporting bracket for the bearing sleeve and a sectional guard casing mounted on said bracket.

8. A power transmitter, comprising in combination a supporting bracket, a levelling screw vertically adjustable in said bracket, a yoke pivotally supported on said levelling screw, a bearing sleeve horizontally pivoted in said yoke, a power shaft journalled in said bearing sleeve, a clutch sleeve slidable on said bearing sleeve, a clutch collar spaced from one end of the bearing sleeve, a connection extending from said collar in slidable relation through a portion of the bearing sleeve into engagement with the sliding clutch sleeve, a driven clutch member rotatable on said clutch sleeve, a driving clutch member on the shaft in cooperative relation to the driven clutch member, a shifting lever pivoted on said yoke and connected with the clutch collar, a brake element on said lever for engagement with the driven clutch member and a spring interposed between the supporting bracket and said shift lever.

9. The combination of claim 8, with an anti-friction bearing retainer fixed on the shaft, rotating freely within said clutch collar and companion anti-friction bearing elements in the end of said bearing retainer adjoining the end of the bearing sleeve.

10. A power transmitter, comprising in combination a supporting bracket, a bearing sleeve mounted in vertical and angularly adjustable relation on said bracket, a shift lever vertically adjustable with said bearing sleeve, a clutch sleeve slidable over said bearing sleeve and connected for actuation by said shift lever, a driven clutch element rotatable on said clutch sleeve, a power shaft journalled in the bearing sleeve, a driving clutch member on said shaft, cooperable with said driven clutch member, a spring interposed between the supporting bracket and shift lever, a brake element carried by said lever for engagement with the driven clutch member and a surrounding sectional guard casing mounted on said supporting bracket clear of the enclosed parts for permitting adjustments of the bearing sleeve described.

11. The combination as in claim 1, with means for supporting said bearing sleeve so that it may rock for alignment of the power shaft and means for securing said bearing sleeve in the position of rocked adjustment.

12. A power transmitter, comprising in combination a bearing sleeve, a power shaft journalled in said sleeve, adjustable supporting means for said bearing sleeve, a clutch element fixed on the power shaft at one end of the bearing sleeve, a freely rotatable companion clutch element longitudinally shiftable on said bearing sleeve, relatively separable front and back guard sections enclosing said bearing sleeve and clutch members, including cylindrical enclosures for the shaft carried by one of said guard sections at the opposite ends of the power transmitter and the other guard section fitting in beween said cylindrical enclosures when engaged with the first guard section and movable from such position in between the end enclosures to expose the entire bearing sleeve and clutch construction of the transmitter.

FREDERICK KOCH.